US008907762B2

(12) United States Patent
Kawamura

(10) Patent No.: US 8,907,762 B2
(45) Date of Patent: Dec. 9, 2014

(54) ELECTRONIC KEY SYSTEM AND ELECTRONIC KEY FOR MEASURING RADIO WAVE SIGNAL STRENGTH DURING A VACANT TIME

(75) Inventor: Masayuki Kawamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 293 days.

(21) Appl. No.: 13/315,771

(22) Filed: Dec. 9, 2011

(65) Prior Publication Data

US 2012/0154114 A1 Jun. 21, 2012

(30) Foreign Application Priority Data

Dec. 17, 2010 (JP) ................. 2010-281764

(51) Int. Cl.
*G08B 21/00* (2006.01)
*B60R 25/20* (2013.01)
*B60R 25/24* (2013.01)

(52) U.S. Cl.
CPC ........... *B60R 25/245* (2013.01); *B60R 25/2072* (2013.01)
USPC .................... 340/5.61; 340/5.72; 340/426.36; 343/703; 455/345

(58) Field of Classification Search
USPC .......... 340/5.61–5.64, 5.72, 426.36; 343/703; 455/345
See application file for complete search history.

(56) References Cited

U.S. PATENT DOCUMENTS

| 6,218,932 B1 | 4/2001 | Stippler |
| 2002/0033752 A1 | 3/2002 | Greenwood et al. |
| 2003/0193388 A1* | 10/2003 | Ghabra et al. ............... 340/5.61 |
| 2005/0057408 A1 | 3/2005 | Asakura et al. |
| 2005/0159131 A1* | 7/2005 | Shibagaki et al. ............ 455/345 |
| 2005/0237163 A1* | 10/2005 | Lee et al. .................. 340/10.51 |
| 2005/0258936 A1* | 11/2005 | Ghabra et al. ............... 340/5.72 |
| 2006/0125600 A1 | 6/2006 | Brillon |
| 2006/0145811 A1 | 7/2006 | Nantz et al. |

(Continued)

FOREIGN PATENT DOCUMENTS

| CN | 101866537 | 4/2010 |
| CN | 201508624 | 6/2010 |

(Continued)

OTHER PUBLICATIONS

Extended European Search Report for EP Application No. EP 11009789, Mailed Aug. 6, 2013, 5 Pgs.

(Continued)

*Primary Examiner* — Mohammad Ghayour
*Assistant Examiner* — Mark Rushing
(74) *Attorney, Agent, or Firm* — Patterson Thuente Pedersen, P.A.

(57) ABSTRACT

An electronic key system that performs ID verification communication to verify an ID of an electronic key. The ID verification communication is started by transmission of a wireless signal from a vehicle and performed between the vehicle and the electronic key. The electronic key system determines the location of the electronic key in accordance with the received signal strength of a radio wave used for the ID verification communication. A signal strength measurement circuit measures a first signal strength, which is the received signal strength when a signal from the electronic key is received, and a second signal strength, which is the received signal strength of the radio wave during a vacant time when the electronic key is performing the ID verification communication. A control unit controls operation of the electronic key in accordance with a measurement result of the first and second signal strengths.

12 Claims, 8 Drawing Sheets

(56) References Cited

U.S. PATENT DOCUMENTS

| | | |
|---|---|---|
| 2006/0267407 A1 | 11/2006 | Nagaoka et al. |
| 2007/0024516 A1 | 2/2007 | Araki et al. |
| 2007/0109093 A1* | 5/2007 | Matsubara et al. .......... 340/5.61 |
| 2008/0309566 A1* | 12/2008 | Russ ............................. 343/703 |
| 2010/0265035 A1 | 10/2010 | Ziller |

FOREIGN PATENT DOCUMENTS

| | | |
|---|---|---|
| DE | 19836957 C1 | 9/1999 |
| DE | 102006008140 A1 | 8/2007 |
| EP | 1189306 A1 | 3/2002 |
| EP | 1513109 A1 | 3/2005 |
| EP | 1726496 A1 | 11/2006 |
| FR | 2877903 A1 | 5/2006 |
| JP | 200713862 | 1/2007 |
| JP | 2007-118899 | 5/2007 |
| JP | 2008288734 | 11/2008 |
| JP | 2008301394 | 11/2008 |

OTHER PUBLICATIONS

Chinese Office Action for Chinese Application No. 2010281764 dated Dec. 24, 2013. English translation not provided.
Japanese Office Action for Japanese Application No. JP2010281764 dated Jun. 17, 2014. No English translation provided.

* cited by examiner

Demodulation Data of Signal Strength Measurement Signal Srs

No Noise ⎍⎍⎍⎍⎍⎍⎍

Noise Present ⎍‾‾‾‾‾‾‾⎍

ELECTRONIC KEY SYSTEM AND ELECTRONIC KEY FOR MEASURING RADIO WAVE SIGNAL STRENGTH DURING A VACANT TIME

CROSS-REFERENCE TO RELATED APPLICATIONS

This application is based upon and claims the benefit of priority from prior Japanese Patent Application No. 2010-281764, filed on Dec. 17, 2010, the entire contents of which are incorporated herein by reference.

BACKGROUND OF THE INVENTION

The present invention relates to an electronic key system that permits operation of an in-vehicle device through communication between an electronic key and a vehicle and to an electronic key for such an electronic key system.

An electronic key system for a vehicle includes an electronic key, which serves as a vehicle key. The electronic key transmits an ID code through wireless communication to the vehicle. The vehicle verifies the ID code. Japanese Laid-Open Patent Publication No. 2007-118899 describes one example of such an electronic key system.

In the electronic key system of the publication mentioned above, the vehicle transmits a request signal. The electronic key receives the request signal, measures the strength of the request signal, and automatically sends the measurement (received request signal strength) and the ID code back to the vehicle. Then, the vehicle performs ID verification. A vehicle transmitter transmits the request signal to the interior and exterior of the passenger compartment. A vehicle controller compares the received request signal strength, which is provided from the electronic key, with a predetermined passenger compartment interior threshold and a predetermined passenger compartment exterior threshold. When the received request signal strength is greater than the interior threshold, the vehicle controller determines that the electronic key is located inside the passenger compartment. When the received request signal strength is greater than the exterior threshold but less than or equal to the interior threshold, the vehicle controller determines that the electronic key is located outside the passenger compartment. If the electronic key is located outside the passenger compartment when ID verification is successful, the vehicle controller permits the locking and unlocking of the vehicle doors. If the electronic key is located inside the passenger compartment when ID verification is successful, the vehicle controller permits the starting of the engine.

In the electronic key system of the publication mentioned above, noise may be mixed with the request signal received by the electronic key due to the surrounding environment of the vehicle. Due to such mixed noise, the received request signal strength at the electronic key may differ from the actual received request signal strength. In such a case, the vehicle controller may not be able to correctly determine the location of the electronic key. Further, it is a drawback that the power consumption of the electronic key is increased for noise determination.

It is an object of the present invention to provide an electronic key system and an electronic key that accurately determine the presence of noise in a communication environment and lower power consumption of the electronic key.

One aspect of the present invention is an electronic key system that performs ID verification communication to verify an ID of an electronic key. The ID verification communication is started by transmission of a wireless signal from a vehicle and performed between the vehicle and the electronic key, and the electronic key system determines the location of the electronic key in accordance with a received signal strength of a radio wave used for the ID verification communication. The electronic key system includes a measurement signal transmission circuit that transmits a signal strength measurement signal from the vehicle to the electronic key. A signal strength measurement circuit measures a first signal strength, which is the received signal strength when the signal strength measurement signal from the electronic key is received, and a second signal strength, which is the received signal strength of the radio wave during a vacant time when the electronic key is performing the ID verification communication. A control unit controls operation of the electronic key in accordance with a measurement result of the first signal strength and the second signal strength.

A further aspect of the present invention is an electronic key for use with an electronic key system. The electronic key system performs ID verification communication to verify an ID of the electronic key. The ID verification communication is started by transmission of a signal from a vehicle and performed between the vehicle and the electronic key. The electronic key system determines the location of the electronic key in accordance with a received signal strength of a radio wave used for the ID verification communication. The electronic key includes a receiver that receives the signal strength measurement signal. A signal strength measurement circuit measures a first signal strength, which is the received signal strength when the signal strength measurement signal is received, and a second signal strength, which is the received signal strength of the radio wave in a vacant time during the ID verification communication. A control unit controls operation of the electronic key in accordance with a measurement result of the first signal strength and the second signal strength.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

An electronic key system according to a first embodiment of the present invention applied to a vehicle will now be described with reference to FIGS. 1 to 7.

Figure 1:
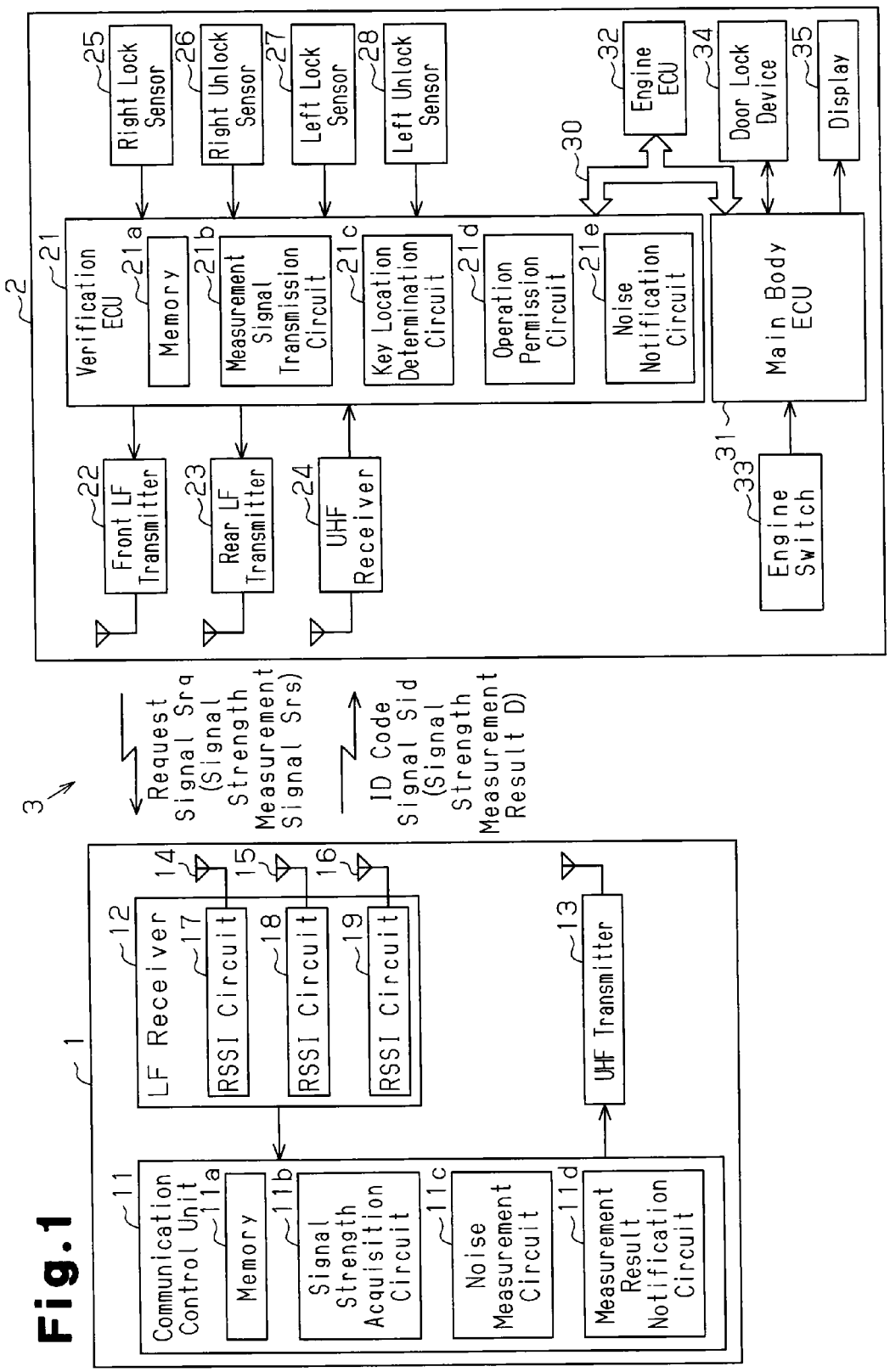
FIG. 1 is a block diagram of an electronic key system.

Referring to FIG. 1, a vehicle 2 includes an electronic key system 3, which uses an electronic key 1 as a vehicle key. The electronic key 1 transmits a unique ID code (key code) through wireless communication. The electronic key system 3 performs ID verification through short range wireless communication (communication range of several meters) performed between the vehicle 2 and the electronic key 1. When ID verification is successful, the driver can perform vehicle operations, such as the locking or unlocking of the vehicle doors and the starting or stopping of the engine, without manipulating a vehicle key.

The electronic key system includes a key-operation-free function that automatically performs ID verification when the electronic key 1 moves toward or away from the vehicle 2 to permit the locking and unlocking of the vehicle doors. The vehicle 2 includes a verification electronic control unit (ECU) 21 and a main body ECU 31. In the vehicle 2, the verification ECU 21 is connected to a front low frequency (LF) transmitter 22, a rear LF transmitter 23, and an ultrahigh frequency (UHF) receiver 24. The front LF transmitter 22 is arranged at the front of the passenger compartment in the floor or the like and transmits a wireless signal in the LF band. The rear LF transmitter 23 is arranged at the rear of the passenger compartment and transmits a wireless signal in the LF band. The UHF receiver 24 is arranged at the rear of the passenger compartment in the vehicle body and receives a wireless signal in the UHF band. The verification ECU 21 performs ID verification on the ID code of the electronic key 1 received through the short range wireless communication (hereafter referred to as smart communication). The main body ECU 31 is connected to the verification ECU 21 by an in-vehicle local area network (LAN) 30. Further, the main body ECU 31 manages a power supply system of the vehicle and the locking and unlocking of the vehicle doors.

The electronic key 1 includes a communication control unit 11, which controls the wireless communication of the electronic key system performed between the electronic key 1 and the vehicle 2. The communication control unit 11 includes a memory 11a that stores the unique ID code (key code). The communication control unit 11 is connected to an LF receiver 12, which receives a signal in the LF band from outside the electronic key 1, and a UHF transmitter 13, which transmits a signal in the UHF band in accordance with a command from the communication control unit 11.

The LF receiver 12 includes received signal strength indicator (RSSI) circuits 17, 18, and 19, which measure the strength of a received wireless signal, and reception antennas 14, 15, and 16, which respectively receive radio waves (wireless signals) in different directions (X axis, Y axis, and Z axis that are orthogonal to one another). Each of the reception antennas 14, 15, and 16 are formed by a bar antenna or coil antenna and are respectively connected to RSSI circuits 17, 18, and 19. In the present example, when a wireless signal is being received, the LF receiver 12 activates the RSSI circuits 17, 18, and 19 one by one and sequentially measures the strength of the wireless signal (received signal strength). The measurements are performed in the order of the RSSI circuits 17, 18, and 19. This order is not limited. The LF receiver 12 provides the communication control unit 11 with the measured received signal strengths (measurement results) of the RSSI circuits 17, 18, and 19, which function as a signal strength measurement circuit.

The verification ECU 21 is connected to a right lock sensor 25 and a left lock sensor 27, which are operated when the driver locks the vehicle doors. Further, the verification ECU 21 is connected to a right unlock sensor 26 and a left unlock sensor 28, which are operated when the driver unlocks the vehicle doors.

The verification ECU 21 attempts to establish smart communication by intermittently transmitting a request signal from the front LF transmitter 22 and the rear LF transmitter 23 at a controlled timing. When the driver leaves the vehicle, the verification ECU 21 starts to intermittently transmit the request signal Srq from the front LF transmitter 22 and the rear LF transmitter 23 in order to initiate smart communication. This may be triggered by the operation of the right lock sensor 25 or the left lock sensor 27. When the electronic key 1 receives the request signal Srq with the LF receiver 12, the electronic key sends back in return an ID code signal Sid, which includes the ID code registered in the memory 11a, from the UHF transmitter 13. The verification ECU 21 verifies the ID code in the ID codes signal Sid from the electronic key 1 with an ID code registered in its memory 21a.

Figure 4:
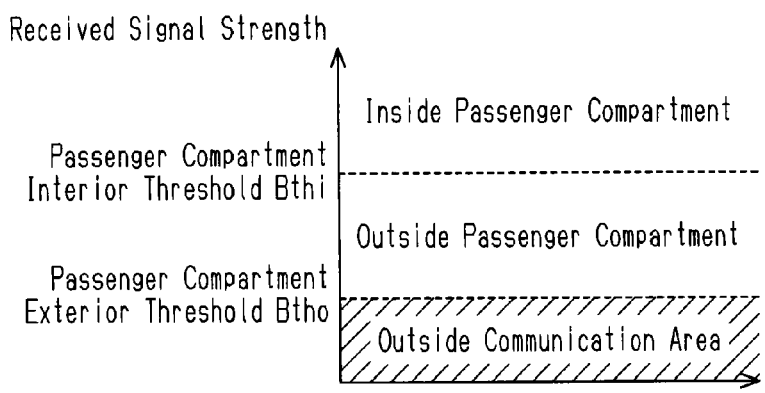
FIG. 4 is a diagram showing thresholds for determining the location of an electronic key from the strength of a received signal.

In the electronic key system 3, the electronic key 1 measures the strength of the request signal Srq transmitted from the vehicle 2 and sends back the ID code signal Sid, which includes the measurement result (signal strength), to the vehicle 2. The vehicle 2 compares the signal strength with a passenger compartment interior threshold Bthi and a passenger compartment exterior threshold Btho, which are shown in FIG. 4. Based on the comparison, the vehicle 2 determines the location of the electronic key 1 and controls the locking or unlocking of the vehicle doors and the starting and stopping of the engine in accordance with the location of the electronic key 1.

Figure 2:
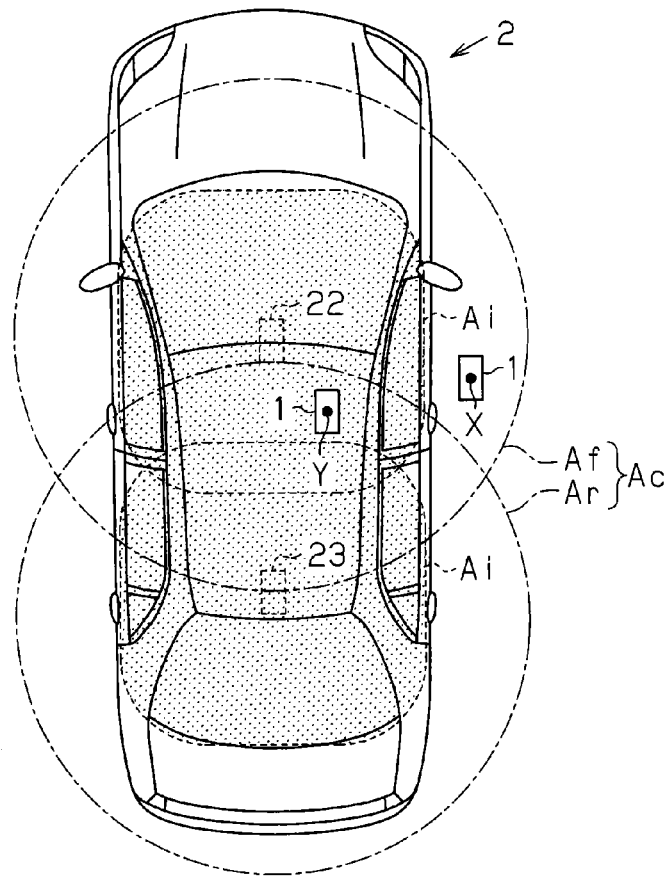
FIG. 2 is a schematic diagram showing a communication area of a vehicle.

Referring to FIG. 2, the front LF transmitter 22 and the rear LF transmitter 23 form a communication area Ac of the vehicle 2. In the illustrated example, the front LF transmitter 22 transmits a wireless signal to a front communication area Af, which includes the front part of the vehicle 2. The rear LF transmitter 23 transmits a wireless signal to a rear communication area Ar, which includes the rear part of the vehicle 2. The front communication area Af and the rear communication area Ar form the communication area Ac of the vehicle 2.

The verification ECU 21 includes a measurement signal transmission circuit 21b, which transmits a signal strength measurement signal Srs from the vehicle 2 to the electronic key 1. The measurement signal transmission circuit 21b adds the signal strength measurement signal Srs to the request signal Srq, which activates the electronic key 1 to perform smart communication between the vehicle key 1 and the vehicle 2. A start bit is included in the head of the signal strength measurement signal Srs to have the electronic key 1 measure the received signal strength. The measurement signal transmission circuit 21b transmits the signal strength measurement signal Srs immediately after the request signal Srq.

The communication control unit 11 of the electronic key 1 includes a signal strength acquisition circuit 11b, which acquires the detection result (received signal strength) from each of the RSSI circuits 17, 18, and 19. When the electronic key 1 receives the request signal Srq (signal strength measurement signal Srs), the signal strength acquisition circuit 11b acquires a reception period signal strength B1, which is measured by each of the RSSI circuits 17, 18, and 19. Further, during a response wait period Tw, which is from when the electronic key 1 receives the request signal Srq to when the electronic key 1 sends back the ID code signal Sid, the signal strength acquisition circuit 11b acquires a non-reception period signal strength B2, which is measured by each of the RSSI circuits 17, 18, and 19.

Figure 3:
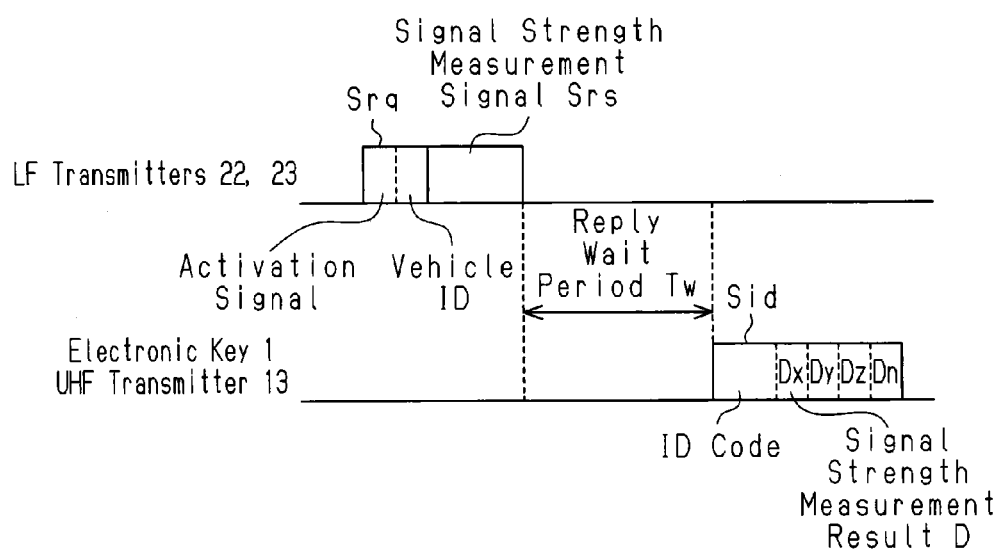
FIG. 3 is a time chart illustrating a communication operation of the electronic key system.

In FIG. 3, the wireless communication performed from when the transmission of the request signal Srq starts to when the transmission of the ID code signal Sid ends is referred to as ID verification communication. The response wait period Tw is one example of a vacant time during ID verification communication and also referred to as a non-reception period. The reception period signal strength B1 is also referred to as a first signal strength. The non-reception period signal strength B2 may be referred to as a second signal strength, a vacant time signal strength, and a background signal strength.

The communication control unit 11 includes a noise measurement circuit 11c, which measures noise in a communication environment. The noise measurement circuit 11c measures noise by comparing the non-reception period signal strength B2 in the response wait period Tw with the reception period signal strength B1 of the signal strength measurement signal Srs. More specifically, the noise measurement circuit 11c calculates a signal strength difference C of the reception period signal strength B1 and the non-reception period signal strength B2. Then, the noise measurement circuit 11c compares the signal strength difference C with a predetermined value Cth to determine whether or not the difference is greater than the predetermined value Cth. The predetermined value Cth is also referred to as a first reference value used to determine whether or not noise is mixed in the request signal Srq. When noise is mixed in the request signal Srq, the non-reception period signal strength B2 increases. However, the reception period signal strength B1 is little affected by noise. Thus, the signal strength difference C becomes small. Accordingly, the comparison result of the signal strength difference C and the predetermined value Cth is used to determine whether or not the electronic key 1 is in a noise environment. When the signal strength difference C is greater than or equal to the predetermined value Cth, the electronic key 1 employs the reception period signal strength B1 of the reception antennas 14, 15, and 16 as the signal strength of the request signal Srq (signal strength measurement signal Srs). When the signal strength difference C is less than the predetermined value Cth, the electronic key 1 does not employ the reception period signal strength B1 of the reception antennas 14, 15, and 16 as the signal strength of the request signal Srq (signal strength measurement signal Srs). The noise measurement circuit 11c is included in a control unit of the present invention.

The communication control unit 11 includes a measurement result notification circuit 11d, which transmits the signal strength measurement result of the noise measurement circuit 11c to the vehicle 2 during smart communication. The measurement result notification circuit 11d adds a signal strength measurement result D to the ID code signal Sid when the electronic key 1 sends back the ID code signal Sid to the vehicle 2 in response to the request signal Srq. Referring to FIG. 3, the signal strength measurement result D includes a received signal strength measurement value Dx taken at the X axis reception antenna 14, a received signal strength measurement value Dy taken at the Y axis reception antenna 15, a received signal strength measurement value Dz taken at the Z axis reception antenna 16, and a noise measurement result Dn. The noise measurement result Dn includes the reception period signal strength B1 of the reception antennas 14, 15, and 16. The measurement result notification circuit 11d is included in the control unit of the present invention.

Referring to FIG. 1, the verification ECU 21 of the vehicle 2 includes a key location determination circuit 21c, which determines whether the electronic key 1 is located inside or outside the passenger compartment. The key location determination circuit 21c determines the location of the electronic key 1 from the signal strength measurement result D transmitted from the electronic key 1. More specifically, as shown in FIG. 4, when the reception period signal strength B1 is less than or equal to the passenger compartment exterior threshold Btho, the key location determination circuit 21c determines that the electronic key 1 is located outside the communication area Ac. When the reception period signal strength B1 is greater than the passenger compartment exterior threshold Btho but less than or equal to the passenger compartment interior threshold Bthi, the key location determination circuit 21c determines that the electronic key 1 is located outside the passenger compartment. When the reception period signal strength B1 is greater than the passenger compartment interior threshold Bthi, the key location determination circuit 21c determines that the electronic key 1 is located inside the passenger compartment. As indicated by the shaded portion in FIG. 2, the inside of the passenger compartment is equivalent to two combined passenger compartment areas Ai, one being formed within a generally equal distance from the front LF transmitter 22 and the other being within a generally equal distance from the rear LF transmitter 23. The outside of the passenger compartment is equivalent to the portion of the communication area AC outside the passenger compartment areas Ai.

The verification ECU 21 further includes a noise notification circuit 21e, which notifies the driver of the presence of noise in the communication environment in accordance with the noise measurement result Dn added to the ID code signal Sid. When determined with the key location determination circuit 21c that the electronic key 1 is in a noise environment, the noise notification circuit 21e instructs the main body ECU 31 to, for example, show a message on a display 35 that prompts the driver to move the electronic key 1. The driver is notified of the noise environment because the key location determination circuit 21c cannot accurately determine the location of the electronic key 1 under a noise environment.

The verification ECU 21 also includes an operation permission circuit 21d that permits the locking and unlocking of the vehicle doors and the operation of the engine based on the location of the electronic key 1 determined by the key location determination circuit 21c. The operation permission circuit 21d may also be included in the control unit of the present invention.

When the key location determination circuit 21c determines that the electronic key 1 is located outside the passenger compartment and not inside the passenger compartment, the operation permission circuit 21d permits the locking and unlocking of the vehicle doors. Then, when the right unlock sensor 26 or the left unlock sensor 28 undergoes a touch operation, the verification ECU 21 instructs the main body ECU 31 to drive a door lock device 34 and unlock the vehicle doors. When the right lock sensor 25 or the left lock sensor 27 undergoes a touch operation, the verification ECU 21 instructs the main body ECU 31 to drive the door lock device 34 and lock the vehicle doors. In this manner, the driver, who is carrying the electronic key 1, only needs to approach the vehicle 2 and touch the unlock sensors 26 and 28 to unlock the vehicle doors.

When the key location determination circuit 21c determines that the electronic key 1 is located inside the passenger compartment, the operation permission circuit 21d does not permit the locking and unlocking of the vehicle doors. In this case, the verification ECU 21 notifies the driver that the electronic key 1 is located inside the passenger compartment.

A smart start system will now be described. The electronic key system 3 includes the smart start system that does not require a physical operation of a key cylinder with a vehicle key when starting or stopping the engine. The smart start system allows the engine to be started or stopped by just operating a start switch. The vehicle 2 includes an engine ECU 32 that executes ignition control and fuel injection control on the engine after the verification ECU 21 succeeds ID verification. The engine ECU 32 is connected by the in-vehicle LAN 30 to various ECUs, such as the verification ECU 21 and the main body ECU 31. An engine switch 33 arranged in front of the driver seat in the vehicle 2 is operated to switch power states (power positions) of the vehicle 2. The engine switch 33, which is, for example, a push switch, is connected to the main body ECU 31.

When the engine switch 33 is pushed, the main body ECU 31 sends an operation signal to the verification ECU 21. When receiving the operation signal, the verification ECU 21 transmits the request signal Srq from the front LF transmitter 22 and the rear LF transmitter 23 to perform ID verification. Then, the key location determination circuit 21c determines whether or not the electronic key 1 is located inside the passenger compartment.

When determining that the electronic key 1 is located inside the passenger compartment, the verification ECU 21 instructs the main body ECU 31 to permit operation of the engine switch 33. When the electronic key 1 is located in the passenger compartment, the main body ECU 31 repetitively shifts the power state whenever the engine switch 33 is pushed in the order of ACC ON, IG ON, and power OFF. Further, when the engine switch 33 is operated under the conditions in which the engine is not running, the brake pedal is depressed, and the electronic key 1 is located in the passenger compartment, the main body ECU 31 instructs the engine ECU 32 to start the engine ECU 32.

The operation of the electronic key system 3 in the present example will now be described.

As shown in FIG. 3, the verification ECU 21 transmits a request signal Srq, which includes a signal strength measurement signal Srs, from the LF transmitters 22 and 23 to start smart communication. The request signal Srq is repetitively transmitted from the LF transmitters 22 and 23 in fixed intervals. The request signal Srq, which includes the signal strength measurement signal Srs, is used for ID verification and location monitoring of the electronic key 1. The request signal Srq includes an activation signal, which activates the electronic key 1, and a vehicle ID, which is unique to the vehicle 2. The measurement signal transmission circuit 21b of the verification ECU 21 transmits the signal strength measurement signal Srs together with the request signal Srq from the LF transmitters 22 and 23 to the communication area AC.

When the electronic key 1 is located in the communication area Ac (refer to FIG. 2), the electronic key 1 can receive the request signal Srq. The LF receiver 12 of the electronic key 1 receives the activation signal and switches the communication control unit 11 from a sleep state (standby state) to an activated state.

Figure 5:
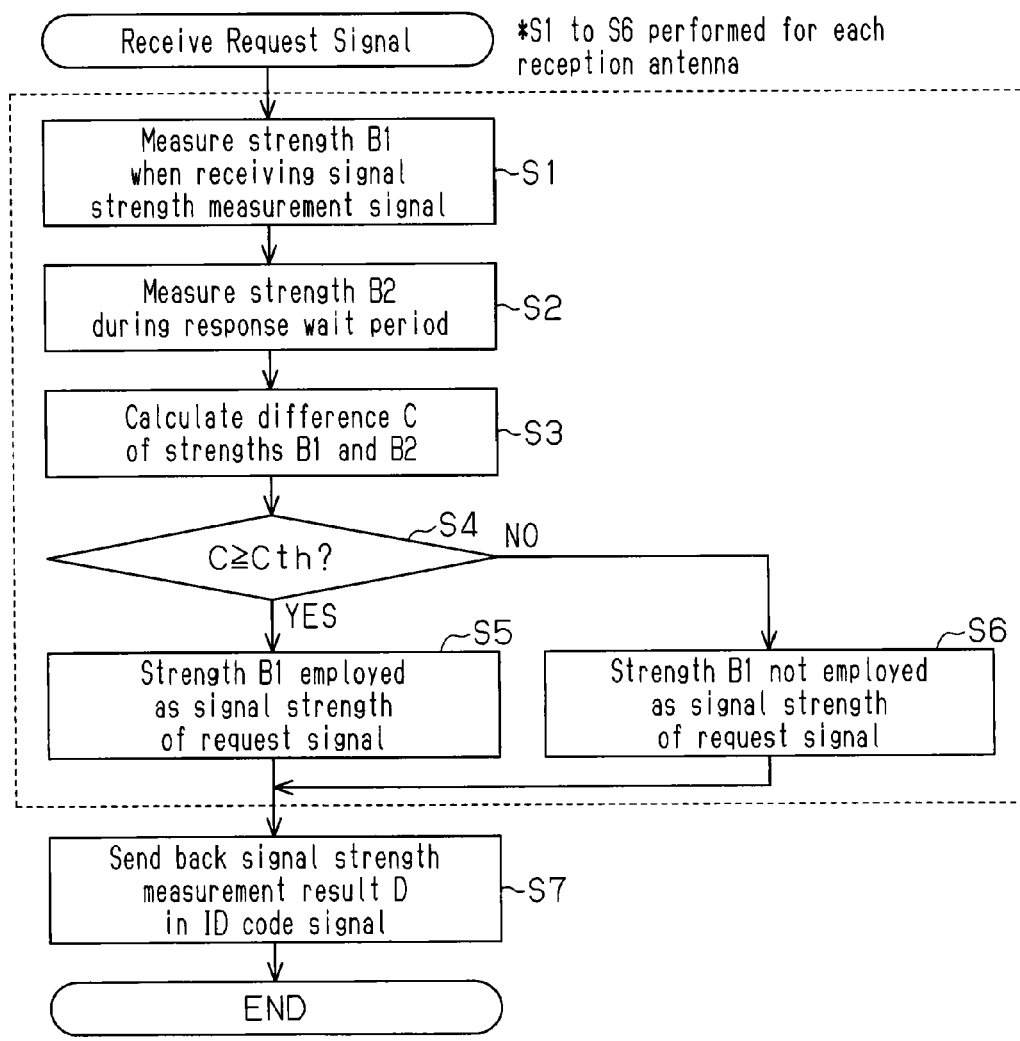
FIG. 5 is a flowchart showing the operation of the electronic key in the electronic key system.

As shown in FIG. 5, after the electronic key 1 is activated, the LF receiver 12 performs a sequence (steps S1 to S6 in FIG. 5), which includes comparison of the signal strength measurement value with a reference value, sequentially for the reception antennas 14, 15, and 16. The sequence is performed in the order of the reception antennas 14, 15, and 16. This order is not limited. The processing performed on the X axis reception antenna 14 will now be described. The Y axis reception antenna 15 and the Z axis reception antenna 16 undergo the same processing.

When the electronic key 1 is activated and the signal strength measurement signal Srs is being received, the first RSSI circuit 17 measures the reception period signal strength B1 at the X axis reception antenna 14 (step S1). The first RSSI circuit 17 sends the measured reception period signal strength B1 to the communication control unit 11.

In response to the request signal Srq, the electronic key 1 sends back an ID code signal Sid. The first RSSI circuit 17 measures the non-reception period signal strength B2 at the X axis reception antenna 14 during the response wait period Tw, which is from when the electronic key 1 receives the request signal Srq to when the electronic key 1 sends back the ID code signal Sid (step S2). The first RSSI circuit 17 sends the measured non-reception period signal strength B2 to the communication control unit 11.

The signal strength acquisition circuit 11b of the communication control unit 11 acquires the reception period signal strength B1 and the non-reception period signal strength B2. The electronic key 1 uses the strengths B1 and B2 to measure the level of noise and determine whether or not to employ the measured reception period signal strength B1 as the signal strength in the request signal Srq. For example, the noise measurement circuit 11c calculates the signal strength difference C of the reception period signal strength B1 and the non-reception period signal strength B2 acquired through the X axis reception antenna 14 (step S3). Then, the noise measurement circuit 11c determines whether or not the calculated signal strength difference C is greater than the predetermined value Cth (step S4). When the signal strength difference C is greater than or equal to the predetermined value Cth, that is, when there is no noise (step S4: YES), the electronic key 1 employs the reception period signal strength B1 at the X axis reception antenna 14 as the signal strength of the request signal Srq (signal strength measurement signal Srs) (step S5). When the signal strength difference C is less than the predetermined period Cth, that is, when the signal strength difference C is significantly small due to the mixing of noise, the electronic key 1 does not employ the reception period signal strength B1 at the reception antenna 14 as the received signal strength of the request signal (step S6). The electronic key 1 performs steps S1 to S6 on the remaining reception antennas 15 and 16 in the same manner. The reception period signal strength B1 at two or more reception antennas may be employed as the received signal strength.

After measuring and comparing the reception period signal strength at each of the reception antennas 14, 15, and 16, the electronic key 1 sends the ID code signal Sid with the signal measurement result D, which includes the employed reception period signal strength B1 and the measurement results at each of the reception antennas 14, 15, and 16, from the UHF transmitter 13 (step S7). The electronic key 1 performs vehicle ID verification on the vehicle ID included in the request signal Srq and sends the ID code signal Sid when the vehicle 2 is registered in the electronic key 1.

Figure 6:
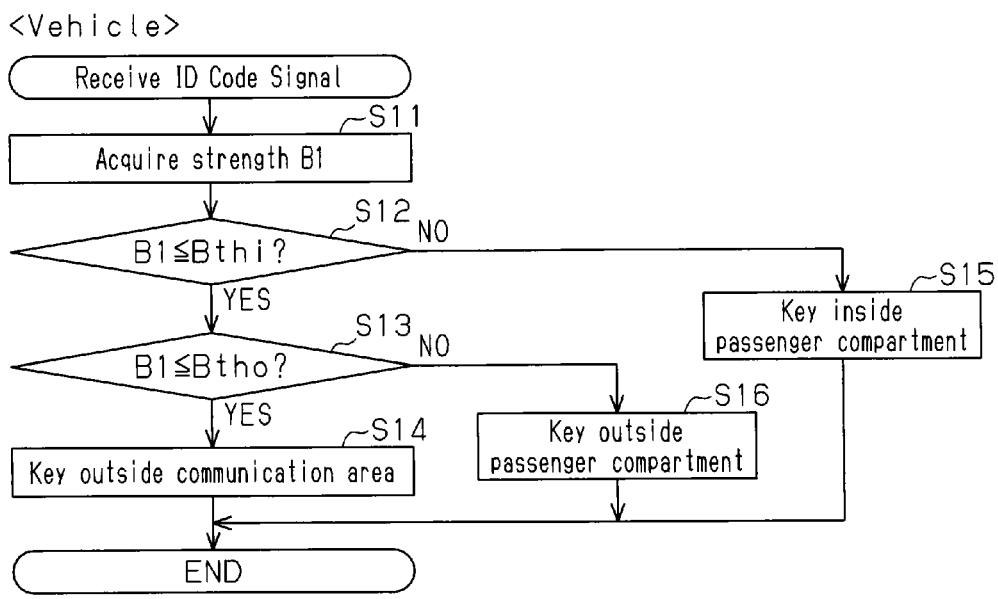
FIG. 6 is a flowchart showing the operation of the vehicle in the electronic key system.

As shown in FIG. 6, when the verification ECU 21 receives the ID code signal Sid, the verification ECU 21 acquires the reception period signal strength (noise measurement result Dn) from the signal strength measurement result D in the ID code signal Sid (step S11). When a plurality of reception period signal strengths is employed, the verification ECU 21 acquires the greatest reception period signal strength or the average value of the reception period signals strengths as a representative reception period signal strength in step S11. The verification ECU 21 determines the location of the electronic key 1 by comparing the reception period signal strength B1 with the thresholds Bthi and Btho. More specifically, the key location determination circuit 21c determines whether or not the reception period signal strength B1 is less than or equal to the passenger compartment interior threshold Bthi (step S12). When the reception period signal strength B1 is greater than the passenger compartment interior threshold Bthi (step S12: NO), that is, when the electronic key 1 is located at position Y in the passenger compartment area Ai, the electronic key 1 determines that the electronic key 1 is located in the passenger compartment (step S15) and ends the processing of FIG. 6.

When the reception period signal strength B1 is less than or equal to the passenger compartment interior threshold Bthi (step S12: YES), the key location determination circuit 21c determines whether or not the reception period signal strength B1 is less than or equal to the passenger compartment exterior threshold Btho (step S13). When the reception period signal strength B1 is greater than the passenger compartment exterior threshold Btho (step S13: NO), for example, when the electronic key 1 is located at position X in the communication area Ac (FIG. 2), the key location determination circuit 21c determines that the electronic key 1 is located outside the passenger compartment (step S16) and ends the processing of FIG. 6.

When the reception period signal strength B1 is less than or equal to the passenger compartment exterior threshold Btho (step S13: YES), the key location determination circuit 21c determines that the electronic key 1 is located outside the communication area Ac (step S14) and ends the processing of FIG. 6.

Figure 7:
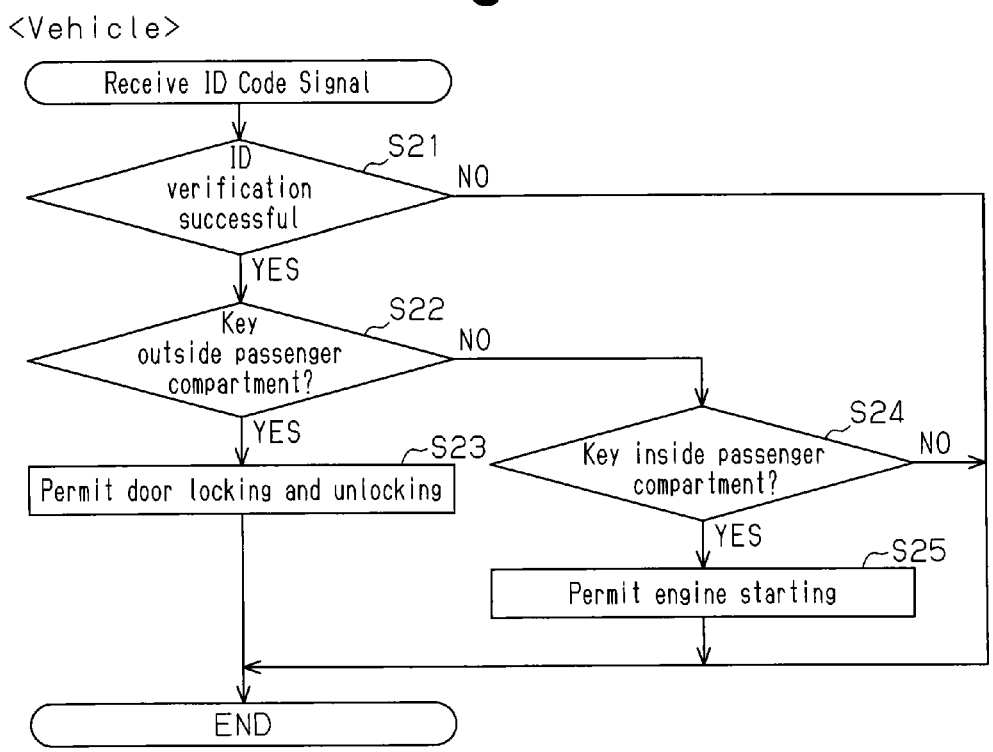
FIG. 7 is a flowchart showing the operation of the vehicle in the electronic key system.

Then, as shown in FIG. 7, the verification ECU 21 performs ID verification on the ID code included in the received ID code signal Sid and determines whether or not the ID verification has been successful (step S21). When the ID verification has succeeded (step S21: YES), the verification ECU 21 permits operation of an in-vehicle device in accordance with the determination of the key location determination circuit 21c. When the ID verification has not succeeded (step S21: NO), the verification ECU 21 ends the processing of FIG. 7.

The operation permission circuit 21d determines whether or not the electronic key 1 is located outside the passenger compartment (step S22). For example, when the electronic key 1 is located at position X and there is no noise in the communication environment, the key location determination circuit 21c determines that the electronic key 1 is located outside the passenger compartment. Based on the determination of the key location determination circuit 21c, the operation permission circuit 21d determines that the electronic key 1 is located outside the passenger compartment (step S22: YES) and instructs the main body ECU 31 to permit the locking or unlocking of the vehicle doors with the door lock device 34 (step S23). In this permitted state, the main body ECU 31 locks the vehicle doors with the door lock device 34 when the right lock sensor 25 or left lock sensor 27 undergoes a touch operation, and the main body ECU 31 unlocks the vehicle doors with the door lock device 34 when the right unlock sensor 26 or left unlock sensor 28 undergoes a touch operation.

When the operation permission circuit 21d determines that the electronic key 1 is not located outside the passenger compartment (step S22: NO), the operation permission circuit 21d determines whether or not the electronic key 1 is located inside the passenger compartment (step S24). For example, when the electronic key is located at position Y and noise is present in the communication environment, the key location determination circuit 21c determines that the electronic key 1 is located outside the passenger compartment (step S24: YES) and instructs the main body ECU 31 to permit the starting and stopping of the engine with the engine ECU 32 (step S25). When the engine switch 33 is pushed, the main body ECU 31 instructs the engine ECU 32 to start or stop the engine.

When determining that the electronic key 1 is not located in the passenger compartment (step S24: NO), the operation permission circuit 21d ends the processing of FIG. 7.

When determining from the signal strength measurement result D that the electronic key 1 is located in a noise environment, the operation permission circuit 21d instructs the main body ECU 31 to show a message such as "move key" on the display 35 and prompt the user to move the electronic key 1. The message may be shown on the display 35 only when the driver is in the passenger compartment.

The electronic key system 3 of the present example compares the reception period signal strength B1, which is measured when the signal strength measurement signal Srs is transmitted from the vehicle 2, with the non-reception signal strength B2, which is measured until the ID code signal Sid is sent, to determine whether or not noise is present in the communication environment. The electronic key 1 employs the reception period signal strength B1 associated with the reception antenna determined as being unaffected by noise and sends an ID code signal Sid including the reception period signal strength B1 to the vehicle 2. When the vehicle 2 retrieves the reception period signal strength B1, which has been determined by the electronic key as being unaffected by noise, the vehicle compares the reception period signal strength B1 with a threshold to determine the location of the electronic key 1. Then, when ID verification succeeds, the vehicle 2 locks or unlocks the vehicle doors and starts or stops the engine in accordance with the location of the electronic key 1.

The present embodiment has the advantages described below.

(1) The electronic key system 3 of the present embodiment measures the reception period signal strength B1 when the signal strength measurement signal Srs is received and the non-reception period signal strength B2 during the response wait period Tw, that is, when the signal strength measurement signal Srs is not received. The electronic key system 3 measures the two signal strengths B1 and B2 during ID verification communication to determine the presence of noise in the communication environment. Thus, the electronic key system 3 improves the accuracy of determining the presence of noise in comparison with an electronic key system that determines the presence of noise outside the ID verification communication period. Further, the electronic key system 3 determines the strength of the received signal when ID verification communication starts during a period in which the electronic key 1 operates to perform ID verification communication. Thus, the electronic key system 3 does not have to constantly operate the electronic key 1 to monitor noise. This allows the operation period of the electronic key 1 to be limited to when ID verification communication is performed thereby lowering the power consumption of the electronic key 1. As a result, the battery of the electronic key 1 requires less frequent replacement.

(2) The response wait period Tw is a vacant time during ID verification communication. The noise measurement circuit 11c measures the signal strength B2 during the vacant time in which an ID verification wireless signal is neither transmitted nor received. The signal strength B2 is used for noise determination. Thus, the signal strength is efficiently measured, and the communication time is shortened.

(3) The LF receiver 12 measures the reception period signal strength B1 and the non-reception period signal strength B2 for each of the reception antennas 14, 15, and 16, which have difference directivities. Various measurement results (Dx, Dy, and Dz) respectively corresponding to the various directivities are obtained, and the possibility that the two signal strengths B1 and B2 can be obtained without being affected by noise increases. This improves the accuracy and stability for determining the presence of noise and the location of the electronic key 1.

(4) The noise measurement circuit 11c compares the signal strength difference C of the reception period signal strength B1 and non-reception period signal strength B2 with the predetermined value Cth. This allows for determination of whether an increase or decrease in the received signal strength is caused by the signal strength measurement signal Srs or by noise. The reception period signal strength B1 associated with the reception antennas 14, 15, and 16 at which the signal strength difference C is greater than or equal to the predetermined value Vth is used to determine the location of the electronic key 1. Thus, the location of the electronic key 1 can be accurately determined.

(5) The UHF transmitter 13 includes the reception period signal strength B1 of the request signal Srq received by each of the reception antennas 14, 15, and 16 in the ID code signal Sid. Thus, the signal reception status of the reception antennas 14, 15, and 16 in the electronic key 1 can be recognized at the vehicle 2. Further, when a signal cannot be normally received by the electronic key 1, for example, the driver can be prompted to move the electronic key 1.

(6) The signal strengths of the reception antennas 14, 15, and 16 can be sequentially measured. Thus, in comparison to when the signal strengths of the reception antennas 14, 15, and 16 are simultaneously measured, a temporarily computing load can be reduced. This also lowers the maximum power consumption.

Second Embodiment

An electronic key system according to a second embodiment of the present invention applied to a vehicle will now be described with reference to FIGS. 1 and 8. The electronic key system of the present embodiment differs from the first embodiment in that the non-reception period signal strength B2 is compared with a threshold during noise measurement. The differences from the first embodiment will be described below. The electronic key system of the present embodiment is configured in the same manner as that of the first embodiment shown in FIG. 1.

Figure 8:
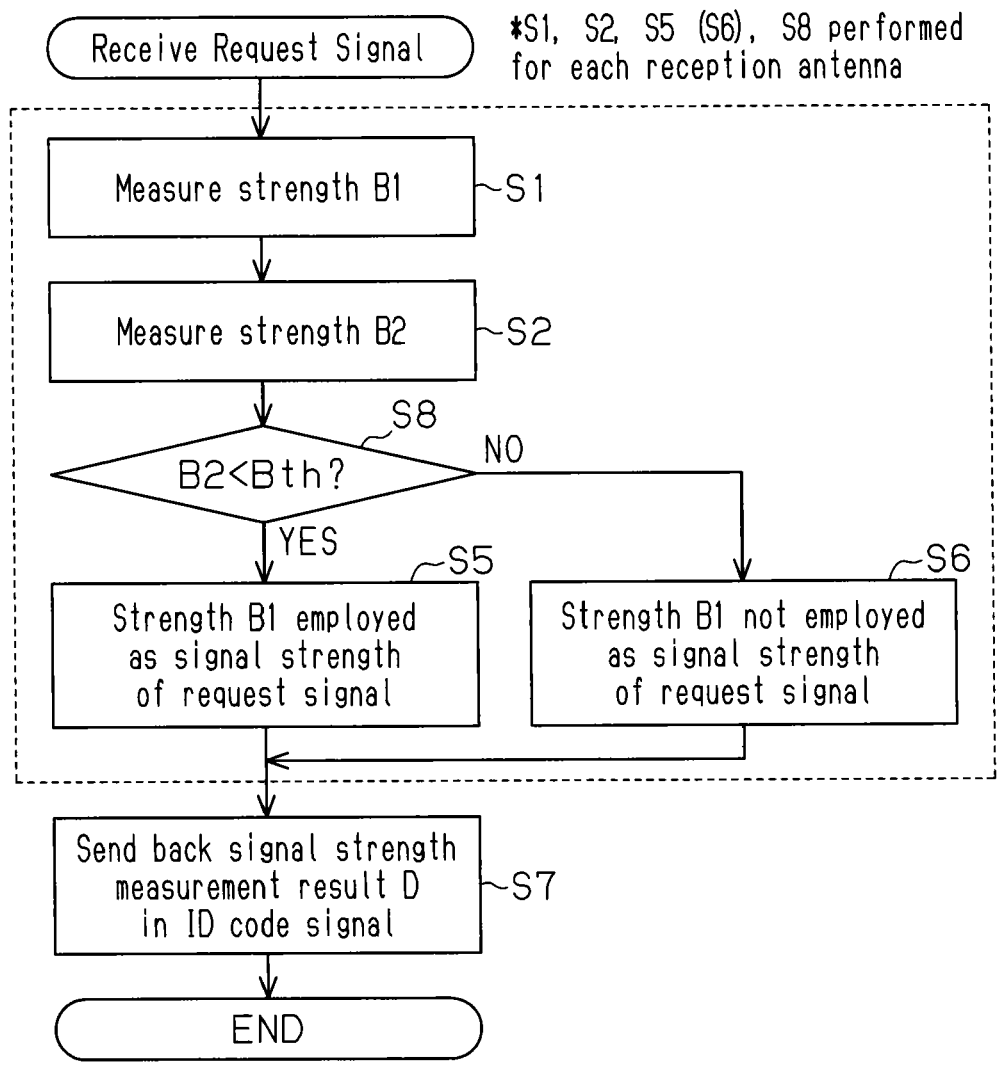
FIG. 8 is a flowchart showing the operation of the electronic key in the electronic key system.

Referring to FIG. 8, when the electronic key 1 is activated, the processing described below is performed for each of the reception antennas 14, 15, and 16 of the LF receiver 12. Here, the processing performed on the X axis reception antenna 14 will be described. The processing of the Y axis reception antenna 15 and Z axis reception antenna 16 are performed in the same manner and thus will not be described. The LF receiver 12 performs the measurement and comparison of the signal strengths sequentially for the reception antennas 14, 15, and 16.

First, the electronic key 1 performs steps S1 and S2 in the same manner as the first embodiment. The electronic key 1 measures noise to determine whether or not to employ the received signal strength of the request signal Srq. More specifically, the noise measurement circuit 11c determines whether or not the non-reception period signal strength B2 at the X axis reception antenna 14 is less than the predetermined value Bth (step S8). When the non-reception period signal strength B2 is less than the predetermined value Bth, that is, when there is no noise (step S8: YES), the electronic key 1 employs the reception period signal strength B1 of the X axis reception antenna 14 as the received signal strength of request signal Srq (signal strength measurement signal Srs) (step S5). When the non-reception period signal strength B2 is greater than or equal to the predetermined value Bth, that is, when the received signal strength is large due to the mixing of noise (step S8: NO), the electronic key 1 does not employ the reception period signal strength B1 of the reception antennas 14, 15, and 16 as the received signal strength of the request signal Srq (step S6). The predetermined value Bth may be referred to as a second reference value for determining noise.

In the same manner as the first embodiment, the electronic key 1 includes the signal strength measurement result D in the ID code signal Sid, which is sent to the vehicle 2 from the UHF transmitter 13 (step S7).

In addition to advantages (1) to (3), (5), and (6) of the first embodiment, the second embodiment has the following advantage.

(7) The noise measurement circuit 11c compares the non-reception period signal strength B2 and the predetermined value Bth. When the non-reception period signal strength B2 is extremely high and greater than or equal to the predetermined value Bth, it can be assumed that noise is mixed. Thus, the presence of noise in the communication environment can be determined or assumed just by comparing the non-reception period signal strength B2 and the predetermined value Bth. Further, the reception period signal strength B1 measured at the reception antennas 14, 15, and 16 corresponding to the reception period signal strength B2 that is less than the predetermined value Bth is used to determine the location of the electronic key 1. This improves the accuracy of determining the location of the electronic key 1.

Third Embodiment

An electronic key system according to a third embodiment of the present invention applied to a vehicle will now be described with reference to FIGS. 1 and 9. The electronic key system of the present embodiment differs from the first embodiment in that the non-reception period signal strength B2 is compared with a threshold during noise measurement, and then the signal strength difference C of the reception period signal strength B1 and non-reception period signal strength B2 is compared with the predetermined value Cth. The differences from the first embodiment will be described below. The electronic key system of the present embodiment is configured in the same manner as that of the first embodiment shown in FIG. 1.

Figure 9:
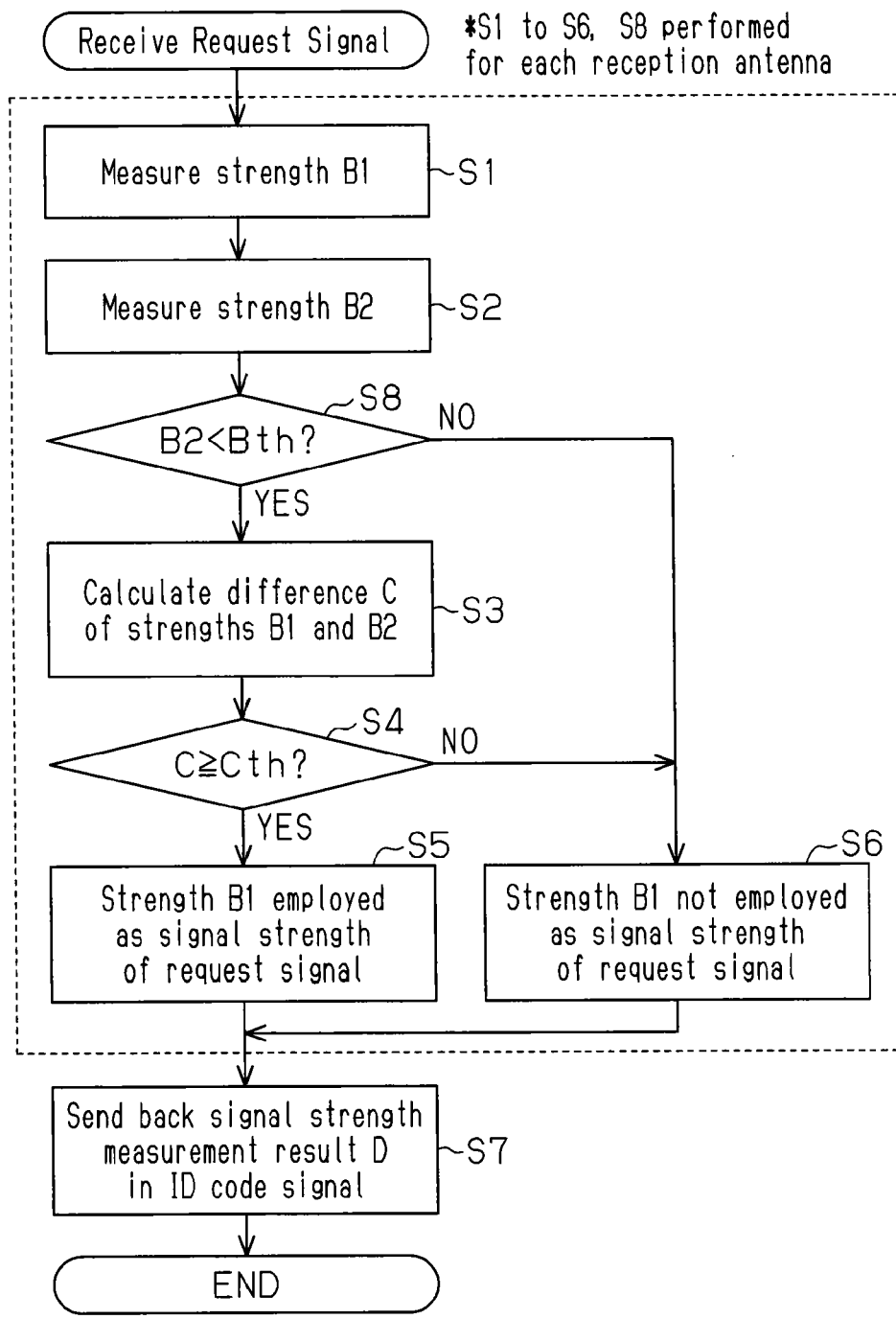
FIG. 9 is a flowchart showing the operation of the electronic key in the electronic key system.

Referring to FIG. 9, when the electronic key 1 is activated, the processing described below is performed for each of the reception antennas 14, 15, and 16 of the LF receiver 12. Here, the processing performed on the X axis reception antenna 14 will be described. The processing of the Y axis reception antenna 15 and Z axis reception antenna 16 are performed in the same manner and thus will not be described. The LF receiver 12 performs the measurement and comparison of the signal strengths sequentially for the reception antennas 14, 15, and 16.

First, the electronic key 1 performs steps S1 and S2 in the same manner as the first embodiment. The electronic key 1 measures noise to determine whether or not to employ the signal strength of the request signal Srq. More specifically, the noise measurement circuit 11c determines whether or not the non-reception period signal strength B2 at the X axis reception antenna 14 is less than the predetermined value Bth (step S8). When the non-reception period signal strength B2 is greater than or equal to the predetermined value Bth, that is, when noise is mixed (step S8: NO), the electronic key 1 employs the reception period signal strength B1 measured at the reception antennas 14, 15, and 16 as the received signal strength of request signal Srq (signal strength measurement signal Srs) (step S6).

When the non-reception period signal strength B2 is less than the predetermined value Bth, that is, when there is no noise (step S8: NO), the electronic key 1 calculates the signal strength difference C of the acquired reception period signal strength B1 and the non-reception period signal strength B2 (step S3). Then, the noise measurement circuit 11c determines whether or not the calculated signal strength C is greater than the predetermined value Cth (step S4). When the signal strength C is greater than or equal to the predetermined value Cth, that is, when there is no noise (step S4: YES), the electronic key 1 employs the reception period signal strength B1 measured at the X axis reception antenna 14 as the received signal strength of the request signal Srq (signal strength measurement signal Srs) (step S5). When the signal strength C is less than the predetermined value Cth, that is, when the received signal strength is extremely small due to the mixing of noise (step S4: NO), the processing proceeds to step S6.

In the same manner as the first embodiment, the electronic key includes the signal strength measurement result D in the ID code signal Sid, which is sent from the UHF transmitter 13 (step S7).

In addition to advantages (1) to (6) of the first embodiment, the second embodiment has the following advantage.

(7) The noise measurement circuit 11c compares the non-reception period signal strength B2 and the predetermined value Bth, calculates the signal difference C, and then compares the signal difference C with the predetermined value. Thus, even when the received signal strength is less than the predetermined value Bth, the presence of noise that affects the signal strength measurement signal Srs can be determined. Further, noise in a communication environment can be accurately determined just by the comparison with the threshold. In addition, the reception period signal strength B1 measured at the reception antennas 14, 15, and 16 corresponding to the reception period signal strength B2 that is less than the predetermined value Bth is used to determine the location of the electronic key 1. This improves the accuracy of determining the location of the electronic key 1.

It should be apparent to those skilled in the art that the present invention may be embodied in many other specific forms without departing from the spirit or scope of the invention. Particularly, it should be understood that the present invention may be embodied in the following forms.

Figures 10, 11:
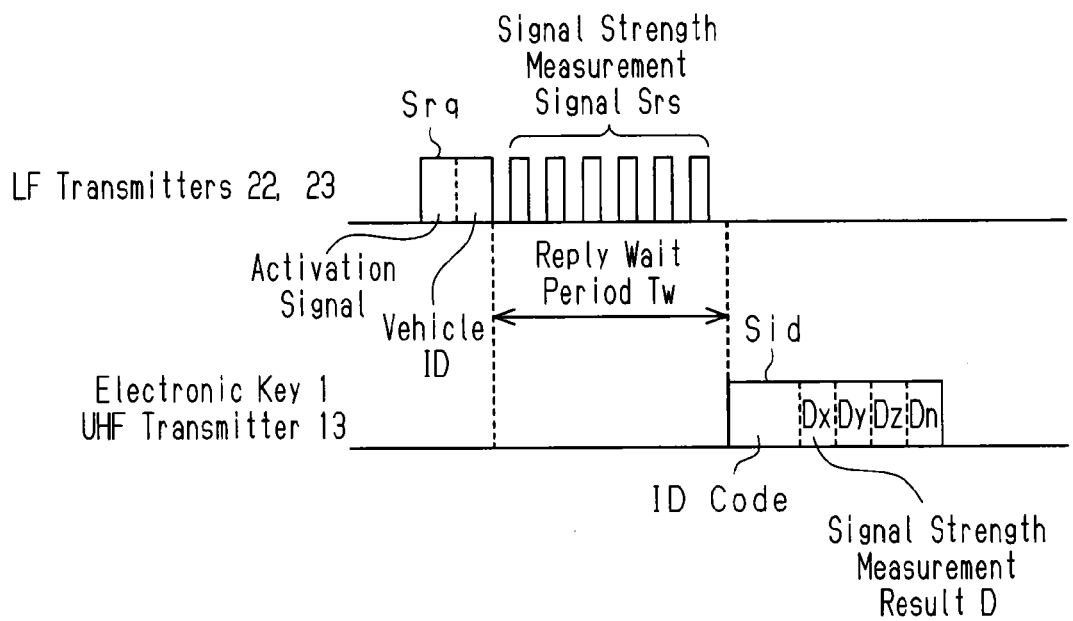
FIG. 10 is a time chart illustrating a communication operation of the electronic key system.
FIG. 11 is a diagram showing a demodulation result of a signal strength measurement signal.

In the above embodiments, the signal strength measurement signal Srs and the request signal Srq may be discrete signals. In this case, the signal strength measurement signal Srs may a binary signal combining a high level and a low level. In the example of FIG. 10, the signal strength measurement signal Srs is a signal that alternately repeats a high level and a low level. After the request signal Srq is transmitted, the signal strength measurement signal Srs is transmitted from the LF transmitters 22 and 23 during the response wait period Tw until the electronic key 1 sends back the ID code signal Sid. The electronic key 1 demodulates the signal strength measurement signal Srs when received by the LF receiver 12. As shown in FIG. 11, when there is no noise in the communication environment, the demodulation result of the signal strength measurement signal Srs is a digital code sequence in which "0" and "1" are alternately repeated. When there is no noise in the communication environment, the demodulation result of the signal strength measurement signal Srs is a digital code sequence that includes successive "1" logic levels and almost no "0" logic levels. When noise is temporarily mixed, the demodulation result of the signal strength measurement signal Srs includes successive "1" logic levels at a portion corresponding to the period during which noise is mixed and includes alternate "0" and "1" logic levels at portions corresponding to periods during which noise was not mixed. In this manner, when the signal strength measurement signal Srs is a binary signal, the mixing of noise can be determined and the timing at which noise mixes can be determined. A period during which the level of the signal strength measurement signal Srs is low functions as the vacant period.

In the above embodiments, communication encrypted by a challenge-response authentication may be used for ID verification. In challenge-response authentication, the vehicle 2 sends a challenge signal Scc to the electronic key 1 during ID verification, the electronic key 1 computes a response to the challenge Scc, and the vehicle 2 determines whether a response signal Sre includes the correct computation result. In the above embodiments, the challenge signal Scc is included in the request signal Sid, and the response signal Sre is included in the ID code signal Sid.

Figure 12:
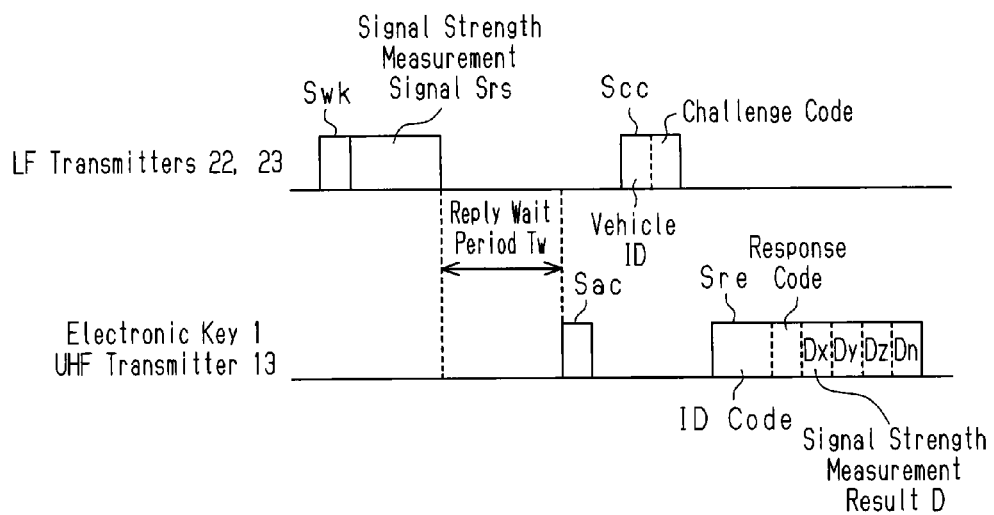
FIG. 12 is a time chart illustrating a communication operation of the electronic key system.

In the above embodiments, as shown in FIG. 12, the request signal Srq may be divided into a wake signal Swk, which serves as an activation signal, and a challenge signal Scc. The wake signal Swk and the signal strength measurement signal Srs are successively transmitted. In this case, when the electronic key 1 sends back an acknowledgement signal (Ack signal) Sac in response to the wake signal Swk, the vehicle 2 returns the challenge signal Scc, which includes the vehicle code ID and a challenge code. When the electronic key 1 receives the challenge signal Scc, the electronic key 1 sends back a response signal Sre including an ID code, a response code, and the signal strength measurement result D.

Figure 13:
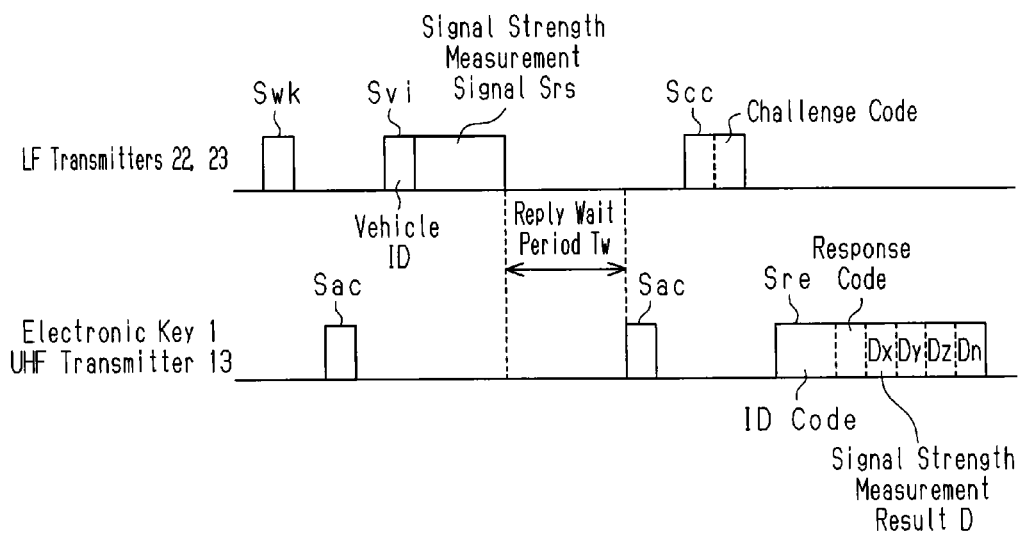
FIG. 13 is a time chart illustrating a communication operation of the electronic key system.

In the above embodiments, as shown in FIG. 13, the request signal Srq may be divided into a wake signal Swk, which serves as an activation signal, a vehicle signal Svi, and a challenge signal Scc. The vehicle signal Svi and the signal strength measurement signal Srs are successively transmitted. In this case, when the vehicle 2 receives an acknowledgement signal Sac from the electronic key 1 in response to a wake signal Swk, the vehicle 2 returns a vehicle signal Svi, which includes the vehicle code ID. When the vehicle 2 receives an acknowledgement signal Sac from the electronic key 1 in response to the vehicle signal Svi, the vehicle 2 sends back in return a challenge signal Scc including a challenge code. When the electronic key 1 receives the challenge signal Scc, the electronic key 1 sends back a response signal Sre including an ID code, a response code, and the signal strength measurement result D.

In the above embodiments, the signal strength measurement signal Srs may include the challenge signal Scc.

In the above embodiments, when the electronic key 1 returns the acknowledgement signal Sac, the acknowledgement signal Sac may include the signal strength measurement result.

In the above embodiments, the signal strength measurement signal Srs is included in the conventional signal. However, a discrete signal strength measurement signal Srs may be transmitted.

In the above embodiments, the RSSI circuits 17, 18, and 19 sequentially measure the signal strength at the reception antennas 14, 15, and 16. However, a switch may be arranged to switch the reception antennas 14, 15, and 16 and measure the signal strength with a single RSSI circuit.

In the above embodiments, the RSSI circuits 17, 18, and 19 sequentially measure the signal strength at the reception antennas 14, 15, and 16. However, the RSSI circuits 17, 18, and 19 may simultaneously measure the signal strength.

In the above embodiments, when the driver leaves the vehicle 2, the touch operation of one of the right lock sensor 25, left lock sensor 27, right unlock sensor 26, and left unlock sensor 28 may trigger the transmission of the request signal Srq (acknowledgement signal Sac) from the front LF transmitter 22 and the rear LF transmitter 23.

In the above embodiments, when a plurality of signal strengths is employed in step S11, the largest value or average value is used. Instead, a three-axes combined value may be computed. In this case, in steps S12 and S13, the location of the electronic key 1 may be determined from the size of a vector obtained from each received signal strength of the three axes.

In the above embodiments, noise measurement is performed at the electronic key 1. Instead, the vehicle 2 may determine the situation of noise from the signal strength measurement result. More specifically, a noise situation determination circuit may be arranged in the verification ECU 21 of the vehicle 2 to perform steps S3 to S6 and measure noise in lieu of the noise measurement circuit 11c of the electronic key 1. In this case, the vehicle 2 determines the noise situation. This lowers the computation result of the electronic key 1 and reduces power consumption of the electronic key 1. Further, the vehicle 2 may determine that the electronic key 1 is under a noise environment and perform an operation that copes with the noise. For example, the vehicle 2 may prompt the user to move the electronic key 1.

In the above embodiments, the vehicle 2 may determine the location of the electronic key 1. However, the electronic key 1 may determine its position. More specifically, a key location determination circuit may be arranged in the communication control unit 11 of the electronic key 1 to perform steps S11 to S17 and determine the key location in the same manner as the key location determination circuit 21c of the vehicle 2.

In the above embodiments, the frequencies of the wireless signals used by the electronic key system 3 are not necessarily limited to LF and UHF and other frequencies may be used. Further, the frequency for transmitting wireless signals from the vehicle 2 to the electronic key 1 does not necessarily have to be different from the frequency for transmitting wireless signals from the electronic key 1 to the vehicle 2 and may be the same.

In the above embodiments, the ID verification performed by the electronic key system does not have to be triggered by a signal transmitted from the vehicle 2 and may be triggered by a signal transmitted from the electronic key 1.

In the above embodiments, the front LF transmitter 22 and the rear LF transmitter 23 are arranged in the passenger compartment but may be arranged outside the passenger compartment.

The LF transmitters 22 and 23 may be located anywhere.

There may be any number of the LF transmitters 22 and 23.

The present embodiment may be applied to the unlocking of the vehicle doors.

The present examples and embodiments are to be considered as illustrative and not restrictive, and the invention is not to be limited to the details given herein, but may be modified within the scope and equivalence of the appended claims.

The invention claimed is:

1. An electronic key system that performs ID verification communication to verify an ID of an electronic key, wherein the ID verification communication is a wireless communication started by transmission of a request signal from a vehicle and ended by completion of transmission of an ID code signal from the electronic key in response to the request signal, and the electronic key system determines the location of the electronic key in accordance with a received signal strength of a radio wave used for the ID verification communication, the electronic key system comprising:
   a plurality of reception antennas having different directivities;
   a measurement signal transmission circuit that transmits a signal strength measurement signal from the vehicle to the electronic key after transmitting the request signal and before receiving the ID code signal;
   a signal strength measurement circuit that measures a first signal strength, which is the received signal strength when the signal strength measurement signal is received by the electronic key, and a second signal strength, which is a non-reception period signal strength in a vacant time in which the signal strength measurement signal is not received when the electronic key is performing the ID verification communication that is from when the electronic key receives the request signal to when the electronic key sends back the ID code signal in response to the request signal, wherein the signal strength measurement circuit measures the first and second signal strengths at each of the reception antennas; and
   a control unit that controls operation of the electronic key in accordance with a measurement result of the first signal strength and the second signal strength, wherein the control unit compares each of the second signal strengths measured at the reception antennas with a predetermined reference value used for noise determination, and transmits the one of the first signal strengths measured at the reception antennas corresponding to a second signal strength that is less than the reference value as the received signal strength of the electronic key.

2. The electronic key system according to claim 1, wherein the vacant time is a wait time from when the electronic key receives the wireless signal from the vehicle to when the electronic key sends back a response signal in response to the wireless signal.

3. The electronic key system according to claim 1, wherein the signal strength measurement circuit is arranged in the electronic key, and the signal strength measurement circuit measures the first and second signal strengths using the reception antennas in order.

4. The electronic key system according to claim 1, wherein the control unit transmits a measurement result of the signal strength measurement unit from the electronic key and notifies the vehicle of the measurement result.

5. The electronic key system according to claim 1, wherein the control unit transmits a measurement result of the signal strength measurement circuit from the electronic key to the vehicle through wireless communication, and the vehicle determines a noise situation during the ID verification communication based on the measurement result received from the electronic key through wireless communication.

6. The electronic key system according to claim 1, wherein the signal strength measurement signal is a binary signal in which a high level and low level are alternately combined.

7. An electronic key system that performs ID verification communication to verify an ID of an electronic key, wherein the ID verification communication is a wireless communication started by transmission of a request signal from a vehicle and ended by completion of transmission of an ID code signal from the electronic key in response to the request signal, and the electronic key system determines the location of the electronic key in accordance with a received signal strength of a radio wave used for the ID verification communication, the electronic key system comprising:

a plurality of reception antennas having different directivities;

a measurement signal transmission circuit that transmits a signal strength measurement signal from the vehicle to the electronic key after transmitting the request signal and before receiving the ID code signal;

a signal strength measurement circuit that measures a first signal strength, which is the received signal strength when the signal strength measurement signal is received by the electronic key, and a second signal strength, which is a non-reception period signal strength in a vacant time in which the signal strength measurement signal is not received when the electronic key is performing the ID verification communication that is from when the electronic key receives the request signal to when the electronic key sends back the ID code signal in response to the request signal, wherein the signal strength measurement circuit measures the first and second signal strengths at each of the reception antennas; and a control unit that controls operation of the electronic key in accordance with a measurement result of the first signal strength and the second signal strength, wherein the control unit compares a difference of the first signal strength and second signal strength for each reception antenna with a predetermined reference value used for noise determination, and transmits the one of the first signal strengths measured at the reception antennas corresponding to a difference that is greater than or equal to the reference value as the received signal strength of the electronic key.

8. The electronic key system according to claim 7, wherein the vacant time is a wait time from when the electronic key receives the wireless signal from the vehicle to when the electronic key sends back a response signal in response to the wireless signal.

9. The electronic key system according to claim 7, wherein the signal strength measurement circuit is arranged in the electronic key, and the signal strength measurement circuit measures the first and second signal strengths using the reception antennas in order.

10. The electronic key system according to claim 7, wherein the control unit transmits a measurement result of the signal strength measurement unit from the electronic key and notifies the vehicle of the measurement result.

11. The electronic key system according to claim 7, wherein the control unit transmits a measurement result of the signal strength measurement circuit from the electronic key to the vehicle through wireless communication, and the vehicle determines a noise situation during the ID verification communication based on the measurement result received from the electronic key through wireless communication.

12. The electronic key system according to claim 7, wherein the signal strength measurement signal is a binary signal in which a high level and low level are alternately combined.

* * * * *